United States Patent [19]
Takegawa et al.

[11] Patent Number: 5,961,946
[45] Date of Patent: Oct. 5, 1999

[54] METHOD FOR RECOVERING CARBON BLACK FROM A WASTE RUBBER SUCH AS TIRES AND THE LIKE AND APPARATUS THEREFOR

[75] Inventors: Toshiyuki Takegawa; Kenichi Arima, both of Nagasaki-ken, Japan

[73] Assignee: Mitsubishi Jukogyo Kabushiki Kaisha, Tokyo, Japan

[21] Appl. No.: 08/701,479

[22] Filed: Aug. 22, 1996

[30] Foreign Application Priority Data

Oct. 9, 1995 [JP] Japan .................................. 7-261547

[51] Int. Cl.$^6$ ...................................................... C01D 3/00
[52] U.S. Cl. .......................................................... 423/449.7
[58] Field of Search ................................ 423/449.7, 460, 423/461; 422/193, 239

[56] References Cited

U.S. PATENT DOCUMENTS

| | | | |
|---|---|---|---|
| 3,945,810 | 3/1976 | Soito | 48/111 |
| 4,250,158 | 2/1981 | Solbakken et al. | 423/449 |
| 4,284,616 | 8/1981 | Solbakken et al. | 423/449 |
| 4,871,426 | 10/1989 | Lechert et al. | 585/241 |
| 4,957,721 | 9/1990 | Lonsinger et al. | 423/461 |

FOREIGN PATENT DOCUMENTS 04367502A 12/1992 Japan .
05287282A 11/1993 Japan .

OTHER PUBLICATIONS

Patent Abstract of Japan, Appln. No. 06168061 filed Jul. 20, 1994, Publication No. 08027394 A, published Jan. 30, 1996.

*Primary Examiner*—Michael Lewis
*Assistant Examiner*—Stuart L. Hendrickson
*Attorney, Agent, or Firm*—Jacobson, Price, Holman & Stern, PLLC

[57] ABSTRACT

The present invention provides a method for producing carbon black and an apparatus therefor, in which a gasification furnace is separated into a lower gasification section and an upper pyrolysis section via a distribution plate, waste tire chips are supplied to the pyrolysis section of the gasification furnace and pyrolytically decomposed to separate it into pyrolysis gas and fixed carbon, fine fixed carbon is separated from a mixed gas discharged from the gasification furnace and supplied to the gasification section of the gasification furnace to generate gasification gas, the gasification gas is supplied to the pyrolysis section through the distribution plate, a mixed gas of pyrolysis gas and gasification gas is introduced after fine fixed carbon is separated, so that carbon black is yielded.

5 Claims, 1 Drawing Sheet

METHOD FOR RECOVERING CARBON BLACK FROM A WASTE RUBBER SUCH AS TIRES AND THE LIKE AND APPARATUS THEREFOR

FIELD OF THE INVENTION AND RELATED ART STATEMENT

The present invention relates to a method for producing carbon black from a waste tire and an apparatus therefor.

With the conventional method for producing carbon black, generally, a material such as creosote oil containing aromatic hydrocarbon is supplied to a high-temperature combustion field obtained by burning a fuel such as natural gas and the supplied material is pyrolytically decomposed, the resultant pyrolysis gas is partially burned to be dehydrogenated, and vapor phase carbon is deposited.

On the other hand, the inventors of this application, paying attention to effective use of waste tires composed of rubber containing much aromatic hydrocarbon and resource recycling effected by this use, have developed a method for producing carbon black from a waste tire and proposed it (Japanese Patent Application No. 6-168061 (No. 168061/1994)).

This method, which provides a basic system for producing carbon black from a waste tire, is to use an apparatus comprising a gasification furnace, in which a gasification section and a pyrolysis section for a waste tire are integrated, and a vapor phase carbon deposition section for depositing vapor phase carbon from pyrolysis gas.

Specifically, this method uses a fixed bed type gasification furnace, and a configuration for this method is shown in FIG. 2. In FIG. 2, reference numeral 1 denotes a gasification furnace, 2 denotes a wind box for supplying and distributing steam S and an oxygen-containing gas G such as air, 3 denotes a gas distribution plate, 4 denotes a gasification section for gasifying fixed carbon in a waste tire, and 5 denotes a pyrolysis section for pyrolytically decomposing a waste tire chip. A waste tire chip 9 put into the gasification furnace 1 is pyrolytically decomposed mainly, in the pyrolysis section 5, by the heat of formation gas 13 supplied from the gasification section 4, made into fixed carbon by releasing volatile matters, and transfers into the gasification section 4. The fixed carbon, which has transferred into the gasification section 4, is partially burned and gasified by a mixed gas of steam S and an oxygen-containing gas G such as air supplied from the wind box 2 through the gas distribution plate 3.

On the other hand, a mixed gas M of a pyrolysis gas produced in the pyrolysis section 5 and a gasification formation gas containing combustible gas such as CO and $H_2$ is supplied to a vapor phase carbon deposition section, not shown, where vapor phase carbon is yielded by burning and dehydrogenation, and carbon black is produced by cooling and collecting the vapor phase carbon.

The above-described carbon black producing method, though being useful as a method for producing carbon black from organic wastes such as waste tires, has problems described below.

(1) The fixed bed gasification system in the above-described method is a simple system. However, in gasification by this method, the supplied waste tire chips and fixed carbon separated by the pyrolysis of waste tire are mixed in the gasification furnace. Therefore, the pyrolysis and gasification of volatile matters in a waste tire, which are highly reactive, take place preferentially, and the recovery of aromatic hydrocarbon for yielding carbon black decreases.

(2) On the other hand, since the yielded fixed carbon is made fine, it accompanies an ascending gas flow and is scattered. Therefore, the gasification of fixed carbon does not proceed sufficiently.

(3) For this reason, the ratio of combustible gas such as CO and $H_2$, which is a heat source necessary in the downstream vapor phase carbon deposition section, is decreased. To burn the scattered fixed carbon, therefore, a large amount of oxidizing agent (oxygen or air) is necessary. As a result, the pyrolysis gas, which is a raw material for carbon black, is also allowed to react (burned), so that the recovery of carbon black is decreased.

OBJECT AND SUMMARY OF THE INVENTION

An object of the present invention is to provide a method for producing carbon black from a waste tire, which solves the above problems with the prior art, and can increase the recovery of aromatic hydrocarbon gas and effectively use the gasification gas of fixed carbon as a heat source by efficiently carrying out the pyrolysis of volatile matters in waste tire and the gasification of fixed carbon.

The present invention includes modes of (1) to (4) described below.

(1) A method for producing carbon black from a waste tire, in which a waste tire is pyrolytically decomposed in a mixed gas of oxygen-containing gas and steam to generate pyrolysis gas containing aromatic hydrocarbon, and the pyrolysis gas is introduced to a high-temperature field where vapor phase carbon is deposited by dehydrogenation and partial burning, comprising the steps of: supplying a waste tire chip to a pyrolysis section of a gasification furnace comprising a lower gasification section and an upper pyrolysis section separated via a distribution plate for a gasification gas; separating the waste tire chip into pyrolysis gas consisting mainly of aromatic hydrocarbon and fixed carbon by pyrolysis while forming a fluidized bed by the high-temperature gasification gas supplied from the gasification section via the distribution plate for gasification gas; separating fine fixed carbon by introducing a mixture of pyrolysis gas, gasification gas, and fine fixed carbon discharged from the gasification furnace to fine powder separating means; supplying the collected fine fixed carbon to the gasification section of the gasification furnace and gasifying the same by oxygen-containing gas and steam to generating a combustible gas consisting mainly of CO and $H_2$ for producing heat necessary for the pyrolysis of waste tire and forming the high-temperature field in which dehydrogenation and partial burning of pyrolysis gas are effected; supplying the gasification gas to the pyrolysis section through the distribution plate for gasification gas; introducing a mixed gas of pyrolysis gas and gasification gas to a vapor phase carbon deposition section after separating fine fixed carbon in the fine powder separating means; forming the high-temperature field by the burning of combustible gas so that dehydrogenation and partial burning of pyrolysis gas are effected; and cooling and collecting the deposited vapor phase carbon.

(2) A method for producing carbon black described in (1), wherein the gasification in the gasification section is carried out under a condition of gasification oxygen ratio of 0.2 to 0.5 and steam/oxygen ratio of 3 to 5 and at a temperature of 800 to 1200° C.

(3) A method for producing carbon black described in (1) or (2), wherein the pyrolysis in the pyrolysis section is carried out at a temperature of 400 to 700° C.

(4) An apparatus for producing carbon black from a waste tire, comprising: a gasification furnace comprising a lower gasification section and an upper pyrolysis section separated via a distribution plate for gasification gas, the lower gasification section having supply means for oxygen-containing gas and steam and a supply port for supplying fine fixed carbon separated in fine powder separating means, and the upper pyrolysis section having a supply port for waste tire chip and a gasification furnace outlet for discharging a mixture of pyrolysis gas, gasification gas, and fine fixed carbon; fine powder separating means for separating fine fixed carbon from the mixture of pyrolysis gas, gasification gas, and fine fixed carbon discharged from the gasification furnace; a fixed carbon discharge/supply line for supplying the fine fixed carbon collected in the fine powder separating means to the gasification section of the gasification furnace; and a vapor phase carbon deposition section where a high-temperature field is formed by the burning of combustible gas by introducing the mixed gas of pyrolysis gas and gasification gas after fine fixed carbon is separated in the fine powder separating means, the dehydrogenation and partial burning of pyrolysis gas are effected, and the deposited vapor phase carbon is cooled and collected.

In the present invention, the gasification furnace is separated into the pyrolysis section for pyrolytically decomposing a waste tire and the gasification section for gasifying fixed carbon yielded by the pyrolysis. In the pyrolysis section, waste tire chips are supplied, and volatile matters in the waste tire is pyrolytically decomposed by using a high-temperature formation gas formed by the gasification of fixed carbon in the gasification section as a heat source. Also, in the pyrolysis section, a fluidized bed type is used so that the fixed carbon made fine after pyrolysis accompanies the formation gas and decomposition gas, and the superficial velocity (ascending velocity) in the gasification furnace of the pyrolysis section is made higher than the precipitation/residence velocity (terminal velocity) of the yielded fine fixed carbon so that fine fixed carbon accompanies the gas flow, being discharged.

For the decomposition gas and formation gas containing fine fixed carbon, fine fixed carbon is separated and collected in fine powder separating means such as the cyclone, and the separated and collected fine fixed carbon is supplied to the gasification section. The mixed gas of pyrolysis gas and gasification gas is introduced to the vapor phase carbon deposition section after fine fixed carbon is separated to form the high-temperature field by the burning of combustible gas so that dehydrogenation and partial burning of pyrolysis gas are effected and carbon black is obtained by cooling and collecting the deposited vapor phase carbon.

The following is a description of the operation of the above configuration.

In the gasification section for fixed carbon, fixed carbon is gasified by the mixed gas of oxygen-containing gas such as oxygen or air serving as gasifying agent and steam to generate a high-temperature combustible gas used as a heat source for promoting pyrolysis in the pyrolysis section for waste tire, that is, the formation gas containing CO and $H_2$. This gasification gas, after being used as a heat source in the pyrolysis section, is used to form the high-temperature field as combustion gas in the vapor phase carbon deposition section. Since only fixed carbon of a fine powder form is supplied to the gasification section, gasification proceeds homogeneously and with increased recovery.

The condition for gasification in the gasification section is that the gasification oxygen ratio is 0.2 to 0.5 and the steam/oxygen ratio is 3 to 5, and a temperature range of 800 to 1200° C. is preferable.

In the pyrolysis section, the volatile matters consisting mainly of aromatic hydrocarbon in the waste tire chip supplied at a temperature of 400 to 700° C. are pyrolytically decomposed by using the high-temperature (800 to 1200° C.) formation gas supplied from the gasification section as a heat source and fluidizing gas. The waste tire chip is fluidized together with the partially separated fixed carbon, and changed into fixed carbon and divided while releasing volatile matters by pyrolysis, so that it turns to small-sized fixed carbon gradually. The fine fixed carbon remaining after pyrolysis is transferred to the fine powder separating means such as the cyclone together with the formation gas and pyrolysis gas (consisting mainly of hydrocarbon) of volatile matter. When the pyrolysis temperature exceeds 700° C., the hydrocarbon is decomposed, and when the pyrolysis temperature is lower than 400° C., low-boiling hydrocarbon unpreferably turns to tar.

The fine fixed carbon contained in the mixed gas of pyrolysis gas and formation gas discharged from the pyrolysis section is separated in the fine powder separating means arranged outside the pyrolysis section, and sent to the gasification section. The gas, after fine fixed carbon is separated, contains hydrocarbon suitable for a raw material for carbon black and formation gas containing CO and $H_2$ which are effective as a fuel for forming the high-temperature field, so that carbon black can be yielded efficiently in the vapor phase carbon deposition section.

In the vapor phase carbon deposition section, hydrocarbon, which is a main component of pyrolysis gas, reacts with oxygen by the following equation to yield vapor phase carbon in the high-temperature field formed by the burning of the formation gas.

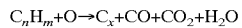

$$C_nH_m+O \rightarrow C_x+CO+CO_2+H_2O$$

The present invention achieves the following effects.

(1) By separating the gasification furnace into the gasification section and pyrolysis section, the pyrolysis of volatile matters of waste tire and the gasification of fixed carbon can be controlled optimally.

(2) By making the pyrolysis section a fluidized bed type, the mixing of waste tire chips and pyrolysis due to uniform mixing with high-temperature formation gas are promoted, and further the fixed carbon is made fine after pyrolysis, so that the fixed carbon can accompany the ascending gas.

(3) By installing the fine powder separating means such as the cyclone and the discharge/supply system for the separated fixed carbon, the separation and collection of fine fixed carbon and its supply to the gasification section become easy, so that the effect of the above item (1) can be achieved sufficiently.

(4) According to the present invention, the recovery of carbon black [(quantity of yielded carbon black/supply quantity of waste tire chip)×100%] increased from 10% to 20–30% as compared with the conventional method shown in FIG. 2 under the condition of the same gasification oxygen ratio (0.25) and the same steam/oxygen ratio (3.0).

DETAILED DESCRIPTION OF PREFERRED EMBODIMENTS

Figure 1:
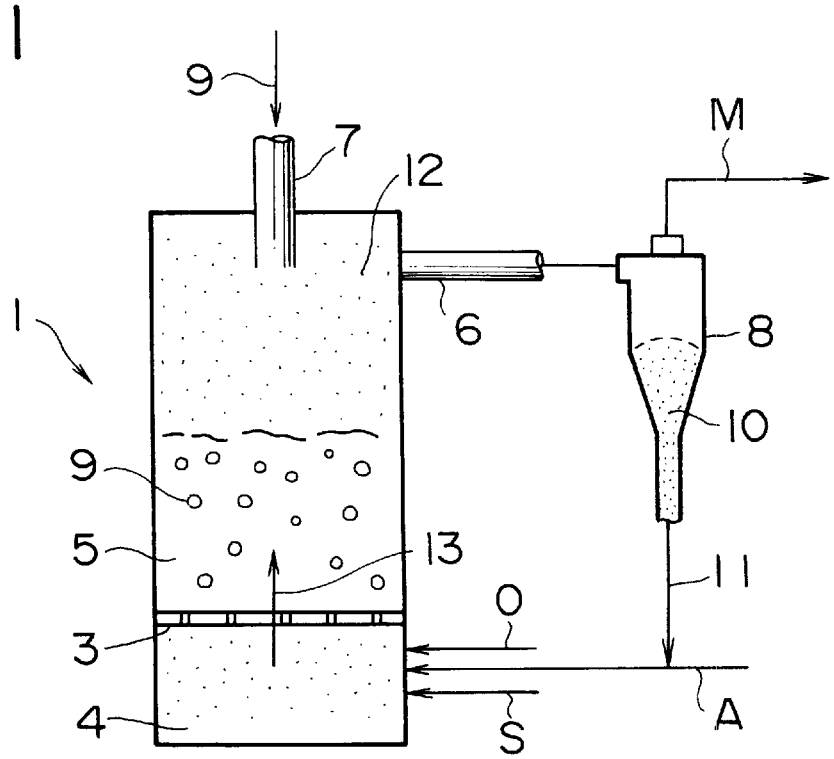
FIG. 1 is a schematic view showing one embodiment of a carbon black producing apparatus in accordance with the present invention.
Figure 2:
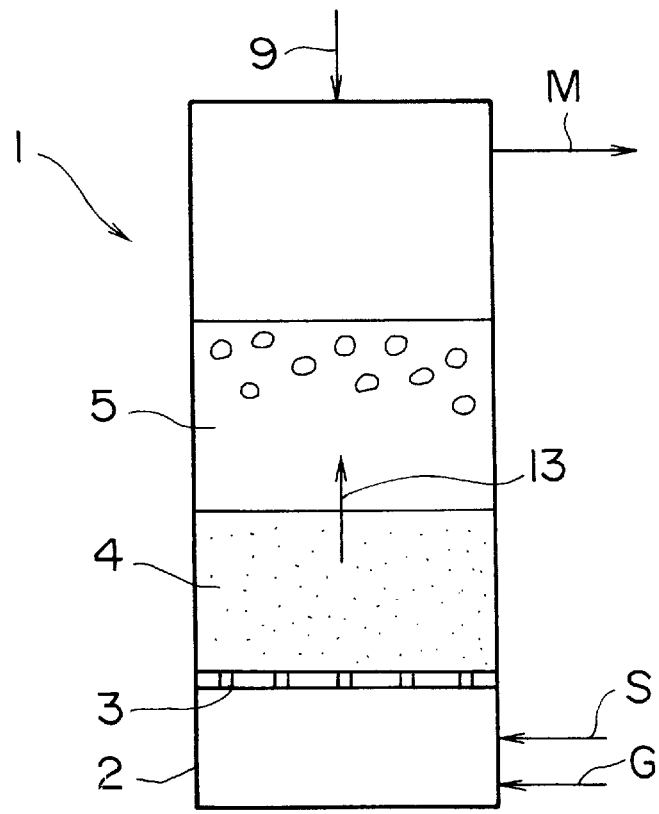
FIG. 2 is a schematic view showing one example of an apparatus for a conventional method for producing carbon black.

An embodiment of the present invention will be described with reference to FIG. 1 showing one embodiment of the present invention. In FIG. 1, reference numeral 1 denotes a gasification furnace, 5 denotes a fluidized bed type pyrolysis section provided on the upper side of the gasification furnace 1, 3 denotes a distribution plate for a formation gas, and 4 denotes a gasification section for gasifying fixed carbon, which is provided on the lower side of the gasification furnace 1. The gasification furnace 1 is separated into two sections, the pyrolysis section 5 and the gasification section 4, by the distribution plate 3. Also, reference numeral 12 denotes a mixed gas of the pyrolysis gas containing fine fixed carbon and the formation gas, 6 denotes a gas outlet pipe provided at the upper part of the gasification furnace 1, 7 denotes a supply pipe for a waste tire chip 9, which is provided on top of the gasification furnace 1, 8 denotes a cyclone, which is fine powder separating means for separating and collecting fine fixed carbon in the pyrolysis gas and the formation gas, 10 denotes fine fixed carbon, 11 denotes a discharge/supply line for fine fixed carbon 10, and 13 denotes a formation gas yielded in the gasification section 4. The cyclone 8 is connected to the gasification furnace 1 via the gas outlet pipe 6.

In this embodiment, the waste tire chip 9 supplied into the gasification furnace 1 through the waste tire chip supply pipe 7 is pyrolytically decomposed while being fluidized, in the pyrolysis section 5 via the distribution plate 3, by the high-temperature gas 13 yielded in the gasification section 4. In the pyrolysis section 5, pyrolysis proceeds at a temperature of 400 to 700° C., and fixed carbon which is difficult to decompose pyrolytically remains. The remaining fixed carbon is made fine by fluidization. The fixed carbon, which has been made fine, accompanies an ascending flow of the pyrolysis gas and the formation gas, which rise in the gasification furnace, being discharged through the gas outlet pipe 6 as the mixed gas 12 of these two gases.

The mixed gas 12 discharged from the gasification furnace 1 enters the cyclone 8. In the cyclone 8, the fine fixed carbon 10 in the mixed gas 12 is separated and collected. The collected fine fixed carbon 10 is supplied to the gasification section 4 via the fine fixed carbon discharge/supply line 11 by a gas such as air A, and gasified by a gasifying agent consisting of an oxidizing agent (oxygen O or oxygen-containing gas) and steam S to generate the formation gas 13 of a high temperature (800 to 1200° C.) used as a heat source in the pyrolysis section and a fluidizing gas, and further as a combustible gas in a vapor phase carbon deposition section.

On the other hand, a mixed gas M of the pyrolysis gas and the formation gas, from which fine fixed carbon 10 is separated in the cyclone 8, is sent to the vapor phase carbon deposition section of the following process, not shown, where carbon black is yielded, cooled, and collected.

The following is a description of one example of a test in which carbon black is produced from waste tire chips by using the apparatus of a type shown in FIG. 1. Waste tire chips 9 cut into a size of 5 to 10 mm were supplied to the pyrolysis section 5 through the waste tire chip supply pipe 7 on top of the gasification furnace 1 at a supply rate of 5 kg/h, and decomposed pyrolytically while being fluidized by the formation gas 13 supplied from the gasification section 4.

The fine fixed carbon 10, which had been collected in the cyclone 8, was carried and supplied to the gasification section 4 by the air A, and gasified under the condition of gasification oxygen ratio 0.4, steam/oxygen ratio 3, and gasification temperature 900 to 1100° C. by supplying oxygen O and steam S, so that the formation gas 13 containing 13% CO and 5% $H_2$ was yielded. The formation gas 13 was sent to the pyrolysis section 5 through the distribution plate 3. By the heat of this formation gas 13, the temperature of the pyrolysis section 5 was kept substantially constant at about 450° C., so that homogeneous pyrolysis could be effected. During the operation of the apparatus, the layer height of the waste tire chips 9 in the pyrolysis section 5 was kept substantially constant. The mixed gas 12 of the formation gas 13, pyrolysis gas, and fine fixed carbon yielded by the decomposition of waste tire chips 9 was discharged. The rising rate of gas in the pyrolysis section 5 was about 0.3 m/s.

The fine fixed carbon 10 discharged by accompanying the formation gas and the pyrolysis gas was collected in the cyclone 8, and supplied to the gasification section 4 for recycling. In this test, the quantity of fine fixed carbon 10 collected in the cyclone 8 was about 1.0 to 1.5 kg/h, being stable without an increasing tendency, so that it is found that the apparatus was operated in an optimum manner for the supply rate of waste tire chip 9 of 5 kg/h. In this condition, the mixed gas M (having an approximate composition of 3% $H_2$, 10% CO, 11% $CO_2$, 4% $C_nH_m$, the balance being $N_2$ on a dry gas basis) of the formation gas and the pyrolysis gas was sent to the vapor phase carbon deposition section after separating fine fixed carbon 10 in the cyclone 8, vapor phase carbon was yielded at a temperature of 1100 to 1200° C., and black carbon was obtained. The yield of black carbon was about 1 kg/h, and the recovery from the waste tire chip 9 was about 20%.

We claim:

1. A method for recovering carbon black from waste rubber comprising the steps of:

providing a gasification furnace having a lower gasification section and an upper pyrolysis section separated via a distribution plate;

supplying waste rubber to said upper pyrolysis section;

decomposing and fluidizing said waste rubber into a pyrolysis gas consisting essentially of aromatic hydrocarbon and carbonaceous material comprising carbon black while forming a fluidized bed above said distribution plate;

producing a gasification gas in said lower gasification section and supplying said gasification gas to said upper pyrolysis section through said distribution plate, said gasification gas providing heat to said upper pyrolysis section for said decomposition and fluidization of said waste rubber;

discharging a mixture of gas consisting essentially of the pyrolysis gas and the gasification gas from said gasification furnace and transporting said mixture of gas to a separating means;

separating out solid phase carbonaceous material comprising carbon black from said mixture of gas in said separating means;

supplying the separated portion of carbonaceous material to said lower gasification section;

gasifying said separated portion of carbonaceous material in said lower gasification section by supplying an oxygen containing gas and steam to generate said gasification gas consisting essentially of CO and $H_2$;

introducing said pyrolysis gas and gasification gas remaining, after solid phase carbonaceous material has been separated out by the separating means, to a vapor phase carbon deposition section;

burning off said gasification gas so that dehydrogenation and partial burning of the pyrolysis gas are effected; and cooling and collecting deposited vapor phase carbon to recover carbon black; wherein about 20–30% of the carbon black present in the waste rubber is recovered.

2. The method according to claim 1 wherein gasification in said gasification section is carried out at a temperature of between 800–1,200° C. and an oxygen/carbon ratio of 0.2:0.5 and a steam/oxygen ratio of 3:5.

3. The method according to claim 1 wherein pyrolysis in said pyrolysis section is carried out a temperature of between 400–700° C.

4. The method according to claim 1 wherein the carbonaceous material further comprises volatile matter, remaining after said waste rubber has been decomposed by pyrolysis.

5. The method of claim 1, wherein the separated portion of carbonaceous materials comprises carbon black particles which are smaller in diameter than the carbon black particles recovered in the vapor phase carbon deposition section.

* * * * *